United States Patent

Heinänen et al.

[11] Patent Number: 6,134,239
[45] Date of Patent: Oct. 17, 2000

[54] METHOD FOR REJECTING CELLS AT AN OVERLOADED NODE BUFFER

[75] Inventors: Juha Heinänen, Tampere; Kalevi Kilkki, Helsinki, both of Finland

[73] Assignee: Sonera OY, Helsinki, Finland

[21] Appl. No.: 08/930,790

[22] PCT Filed: Mar. 14, 1996

[86] PCT No.: PCT/FI96/00154

§ 371 Date: Apr. 23, 1998

§ 102(e) Date: Apr. 23, 1998

[87] PCT Pub. No.: WO96/29804

PCT Pub. Date: Sep. 26, 1996

[30] Foreign Application Priority Data

Mar. 17, 1995 [FI] Finland ..................... 951278

[51] Int. Cl.[7] ........................................... H04J 3/16
[52] U.S. Cl. ................................. 370/412; 370/229
[58] Field of Search ............................. 370/412, 428,
370/395, 389, 468, 235, 462, 233, 229,
231, 232, 234, 230, 252, 396, 397, 399,
409, 411, 413, 414, 415, 416–419, 443,
444, 447; 709/247; 340/825.5, 825.51,
825.52

[56] References Cited

U.S. PATENT DOCUMENTS 5,153,877 10/1992 Esaki et al. ........................ 370/462
5,737,314 4/1998 Hatono et al. ..................... 370/235
5,923,627 7/1999 Miwa et al. ........................ 369/47

*Primary Examiner*—D. Ton
*Attorney, Agent, or Firm*—Cohen, Pontani, Lieberman & Pavane

[57] ABSTRACT

A method for managing a buffer in a data network in which buffering is performed impartially for all connections. Data is transferred in frames each made up of a plurality of data cells. The data is buffered in a node point in the network in order to adapt the data network capacity to correspond to the capacity required by the transferable data. In a data overload situation at the buffer (or when the overload limit is about to be exceeded), the number of cells to be buffered and directed to the node point are predeterminately restricted.

6 Claims, 4 Drawing Sheets

| SOURCE | ON-PROB-ABILITY* | PEAK RATE/LINK RATE | FRAME SIZE IN CELLS | MEAN RATE/LINK RATE |
|---|---|---|---|---|
| S1 | 1 | 0.01 | 10 | 0.01 |
| S2 | 0.5 | 0.08 | 4 | 0.04 |
| S3 | 0.5 | 0.12 | 6 | 0.06 |
| S4 | 0.5 | 0.16 | 8 | 0.08 |
| S5 | 0.5 | 0.20 | 10 | 0.10 |
| S6 | 0.2 | 0.50 | 10 | 0.10 |

| ALGORITHM | SOURCES | | | | | | | | $B_{NVA}$ | FAIRNESS INDEX |
|---|---|---|---|---|---|---|---|---|---|---|
| | 5*S2 | | 4*S3 | | 3*S4 | | 3*S5 | | | |
| | $B_i$ SIMUL. | $B_i^*$ REFER. | $B_i$ SIMUL. | $B_i^*$ REFER. | $B_i$ SIMUL. | $B_i^*$ REFER. | $B_i$ SIMUL. | $B_i^*$ REFER. | | |
| PURE FIFO | 0.0443 | 2.38E-4 | 0.0734 | 0.0270 | 0.0860 | 0.1039 | 0.1307 | 0.1829 | 0.0881 | 0.51 |
| A1 | 0.0647 | 2.28E-4 | 0.0667 | 0.0209 | 0.0639 | 0.0763 | 0.0640 | 0.1336 | 0.0648 | 0.17 |
| A2 | 5.28E-4 | 2.30E-4 | 0.0362 | .00199 | 0.0827 | 0.0741 | 0.1112 | 0.1313 | 0.0632 | 0.77 |
| A3, Z=0.5 | 4.00E-4 | 2.12E-4 | 0.0233 | 0.0193 | 0.0731 | 0.0716 | 0.1211 | 0.1257 | 0.0608 | 0.95 |
| A3, Z=0.9 | 2.80E-4 | 1.78E-4 | 0.0215 | 0.0185 | 0.0689 | 0.0679 | 0.1157 | 0.1191 | 0.0576 | 0.96 |
| A3, Z=1 | 8.57E-4 | 1.81E-4 | 0.0217 | 0.0191 | 0.0724 | 0.0714 | 0.1217 | 0.1250 | 0.0605 | 0.96 |

*FIG. 4*

| ALGORITHM | SOURCES | | | | | | | | $B_{NVA}$ | FAIRNESS INDEX |
|---|---|---|---|---|---|---|---|---|---|---|
| | 20*S1 | | 4*S3 | | 3*S4 | | 3*S5 | | | |
| | $B_i$ SIMUL. | $B_i^*$ REFER. | $B_i$ SIMUL. | $B_i^*$ REFER. | $B_i$ SIMUL. | $B_i^*$ REFER. | $B_i$ SIMUL. | $B_i^*$ REFER. | | |
| PURE FIFO | 0.0895 | 0 | 0.0630 | 0.0241 | 0.0784 | 0.0989 | 0.1024 | 0.1767 | 0.0842 | 0.27 |
| A1 | 0.0483 | 0 | 0.0619 | 0.0156 | 0.0619 | 0.0683 | 0.0621 | 0.1254 | 0.0589 | 0.20 |
| A2 | 0 | 0 | 0.0627 | 0.0138 | 0.0730 | 0.0640 | 0.0710 | 0.1173 | 0.0548 | 0.34 |
| A3, Z=0.5 | 0 | 0 | 0.0223 | 0.0160 | 0.0703 | 0.0683 | 0.1180 | 0.1247 | 0.0589 | 0.92 |
| A3, Z=0.9 | 0 | 0 | 0.0195 | 0.0153 | 0.0672 | 0.0658 | 0.1153 | 0.1197 | 0.0565 | 0.94 |
| A3, Z=1 | 0 | 0 | 0.0191 | 0.0149 | 0.0657 | 0.0645 | 0.1133 | 0.1176 | 0.0556 | 0.94 |

*FIG. 5*

| ALGORITHM | SOURCES | | | | | | | | $B_{NVA}$ | FAIRNESS INDEX |
|---|---|---|---|---|---|---|---|---|---|---|
| | 2*S6 | | 4*S3 | | 3*S4 | | 3*S5 | | | |
| | $B_i$ SIMUL. | $B_i^*$ REFER. | $B_i$ SIMUL. | $B_i^*$ REFER. | $B_i$ SIMUL. | $B_i^*$ REFER. | $B_i$ SIMUL. | $B_i^*$ REFER. | | |
| PURE FIFO | 0.2716 | 0.5108 | 0.0884 | 5.67E-3 | 0.1086 | 0.0437 | 0.1523 | 0.1109 | 0.1503 | 0.19 |
| A1 | 0.1439 | 0.3521 | 0.0846 | 3.60E-3 | 0.0956 | 0.0310 | 0.0991 | 0.0768 | 0.1039 | 0.04 |
| A2 | 0.3502 | 0.3718 | 5.68E-3 | 3.53E-3 | 0.0433 | 0.0329 | 0.0842 | 0.0803 | 0.1094 | 0.90 |
| A3, Z=0.5 | 0.3574 | 0.3509 | 4.67E-3 | 3.47E-3 | 0.0322 | 0.0314 | 0.0702 | 0.0762 | 0.1035 | 0.96 |
| A3, Z=0.9 | 0.3516 | 0.3433 | 4.17E-3 | 3.15E-3 | 0.0293 | 0.0288 | 0.0661 | 0.0729 | 0.1002 | 0.95 |
| A3, Z=1 | 0.3509 | 0.3487 | 6.84E-3 | 3.39E-3 | 0.0312 | 0.0301 | 0.0698 | 0.0749 | 0.1023 | 0.97 |

*FIG. 6*

| STAGGERING (G) NUMBER OF LEVELS SOURCES | 1 500 | 10 50 | 25 20 | 50 10 | 100 5 |
|---|---|---|---|---|---|
| 5*S2 + 4*S3 + 3*S4 + 3*S5 | 0.95 | 0.95 | 0.94 | 0.92 | 0.88 |
| 20*S1 + 4*S3 + 3*S4 + 3*S5 | 0.92 | 0.88 | 0.83 | 0.79 | 0.70 |
| 2*S6 + 4*S3 + 3*S4 + 3*S5 | 0.96 | 0.96 | 0.96 | 0.97 | 0.92 |

FIG. 7

| SOURCE S5 FRAME SIZE: RATIO OF BUFFER SIZE TO FRAME SIZE | 10 200 | 20 100 | 32 62.5 | 50 40 | 100 20 |
|---|---|---|---|---|---|
| 5*S2 + 4*S3 + 3*S4 + 3*S5 | 0.95 | 0.95 | 0.89 | 0.87 | 0.78 |
| 20*S1 + 4*S3 + 3*S4 + 3*S5 | 0.92 | 0.88 | 0.84 | 0.77 | 0.66 |
| 2*S6 + 4*S3 + 3*S4 + 3*S5 | 0.96 | 0.96 | 0.95 | 0.95 | 0.90 |

FIG. 8

METHOD FOR REJECTING CELLS AT AN OVERLOADED NODE BUFFER

BACKGROUND OF THE INVENTION

1. Field of the Invention

This invention relates to a method defined in the introductory part of claim 1 for managing a buffer in a data network, in which the data is divided into frames and the frame has several cells.

2. Description of the Related Art

At the present high-speed data networks are used for the data transfer, of which an ATM-network (Asynchronous Transfer Mode)-network can be mentioned as an example. Besides high transfer speeds the most significant advantages of the ATM include a connectable and dynamic architecture. ATM can easily be adapted for different occasional telecommunication speeds. ATM- terminal devices can also reserve the desired portion of the band width of the ATM-network in order to establish connections similar to a telephone network. Due to the connection distance one of the most important factors influencing the ATM performance is the architecture of the coupling circuit in the ATM-device.

When information is transferred between two computers through private and public ATM-networks, the transmitter must negotiate with each node or node point along the way concerning the routing of the packages, transfer speeds and service levels. The process is in principle analoguous to the connection establishment in a telephone network. The most remarkable difference is the determination of the service level. The communications description defines the parameters for the average transfer speed of ATM-cells as well as the burst duration and the delay variation tolerance. It is also determined, whether the connection serves constant bit rate or variable bit rate sources and whether the question is about connectable, as frame relay, or nonconnectable communications known from the local network.

Depending on the agreed service level the nodes follow priorities, which determine, which of the willing cells is allowed firstly inside the ATM-circuit. Besides it is determined by priorities, which of the cells are removed firstly, when the transfer channel is for some reason overloaded.

An ATM-connection is established by paths (Virtual Path) formed inside a physical copper or light cable and connecting together nodes and terminal devices, which paths for their part are divided into several logical virtual channels. By paths the stationary reserved connections are realized and by channels the connectable temporary connections. Thanks to the flexible architecture each parallel channel of one path can transfer data of different type. The conception of virtuality peculiar to ATM is therefore generated by the idea, that the physical movement of a cell through the ATM coupling circuit lasts only for a while, though the connection is available all the time.

The fixed length of an ATM-cell has been chosen as 53 bytes, of which 48 bytes include actual information. In order to save space the 5-byte header of the ATM-cell does not comprise all necessary routing information, but only data of the next path (VP) and channel (VC). ATM assumes that the underlying transfer path is reliable, whereby the node points do not check the integrity of the data they transfer.

The path usually comprises several channels seeking for the transfer capacity. It is therefore obvious that in a certain stage several packages are simultaneous striving to attain the node. On the other hand the dynamically varying transfer speed may cause in the case of burst-filled communications situations, in which the optimal transfer speed of the node point is exceeded. Inner blocking takes place in the circuit itself for example in the case, when two data packages going to different out-ports are obliged to use the same inner route. If the circuit is not able to adapt two cells simultaneously to the same route, the other cell must be buffered or even destroyed. Upon the delivery blocking two cells are competing for the same out-port. By placing the buffer to the out-port, part of the problems is avoided. The buffer may operate either by the FIFO- line principle or according to priorities, whereby the time-depending audio and video files can be transferred ahead the other data.

When fixed transfer speeds are used in a node point, jamming does cause problems. Troubles emerge only when the communication quantity can sway together with random data buffers. Inner buffering of the node point eliminates short peak loads. The buffer seizes all the data packages, whose speed exceeds the handling ability of the node. Transfer of packages to the circuit takes subsequently place either by queueing or priority. For the jamming control also different priorite levels are needed for normal data and control information.

The structure and control of buffers may be the most important of the details connected to the ATM-coupling or node point. Buffering is needed in order that switches would not lose packages or frames in burst-filled traffic. Buffers are on the other hand harmful, because their construction is costly and as large devices they cause irritating delays. The buffer size depends on the circuit architecture and the adaptation. Most nodes have been planned on the starting buffers, whereby the packages go through the node before stopping. Also inner input and node buffers have been used.

The deeper into the buffer the data must be transferred, the more harmful delay is generated. Therefore the port-related buffers should be as short as possible. The node should mostly comprise space for at the most 50–256 cells to be buffered per port. In greater package amounts one must rely upon the traffic balancing techniques of the ATM-network.

A substantial part of the ATM-network traffic comprises data communications, especially between local networks. Typical for this kind of traffic are very great variations, the anticipation of which is difficult. On the other hand the data communications can often be adapted to the variations of the available capacity. For the most effective utilization of the ATM-network capacity the network can announce to the user the highest permissible transfer speed of the connection. For this a so-called ABR (Available Bit Rate) -service is under development. Another possibility is that the network does not inform the overloading situations to the users, but the user observes them as loss of data frames (Unspecified Bit Rate, UBR-service). In both cases it is very important that losses of frames are distributed fairly to different connections. Fair buffering causes, however, a significant problem, because transfer speeds in the ATM-network are very high, whereat realization of complicated protocolls and buffering methods causes great additional costs. Buffers with large physical size are also often used, which in this case require valuable space in the circuit board and engender extra costs.

Some methods for buffer control are already known. In the weighted Fair Queueing (WFQ) -method certain portion of the buffer capacity of each node is reserved for each connection. The number of buffer places needed by each connection depends on the traffic parameters defined for the connection. By this principle it is possible to guarantee for each connection (following the agreed traffic parameters) a trouble-free service regardless other traffic in the network.

By WFQ it is possible to guarantee trouble-free service simultaneously for very different connections. Its technical realization is however difficult, because it requires both a sophisticated buffering system and a complicated method, by which it is determined, which cells are accepted to the buffer. Static distribution of the buffer capacity based on WFQ requires very large buffers in each network node, if the number of connections is high.

Another known solution is a so-called Random Early Drop (RED), in which the data frame to be dropped during the overloading situation is randomly selected. The RED-principle is suitable for networks without connections, in which there is no information about the connections and their amounts. The ATM-network is, however, connectable in nature, so that rejection of frames may be done on the basis of data related to the connections.

A third solution is based on the fact that the network informs the users about the overloading situation in the network using e.g. a method of the EFCI-type (Explicit Forward Congestion Indication). When the network has sent an EFCI-notice, it is assumed that the users reduce the speed of the traffic to be sent to the network.

The solutions of both the RED and EFCI-type are simple from the view of the buffering realization. By them it is, however, very difficult to protect other network users, if some connection does not follow in advance agreed procedures in the overloading situation. By these methods it is not therefore possible to realize a fair capacity distribution. In large networks the influence of an EXCI-notice begins after a delay of considerable length, even tens of milliseconds. In order to keep moderate the amount of lost cells and frames, very large buffers are needed in each network node. EFCI requires equipment alterations in all parts of the network from connection cards to network nodes. Further on the most available embodiments cannot react to an EFCI-notice.

SUMMARY OF THE INVENTION

The objective of the invention is to eliminate the above-mentioned problems. The purpose of the present invention is especially to achieve a novel method and system in order to control a buffer, i.e. a buffer space, in the data network, as in ATM-network, and thus to enable effective operation fair to all network connections, which can be utilized in the data traffic of the data network. Because of the present invention it is possible to satisfy the requirements set forth naturally for the control method of the data traffic of the data and ATM-network: simple realization, fair capacity distribution for different connections and effective utilization of the network resources.

In the method according to the invention, and with reference to FIGS. 2A and 2B, for the control of a buffer 12 in the data network comprising a number of 14 and the data bus 16 connecting them and including a predefined amount of connections 18, data is transferred in frame form so that a data frame 20 comprises a number of data cells $c_1$, $c_2 \ldots c_n$, and data is buffered in the node point 14 in order to adapt the data network capacity and the capacity required by the transferable data to correspond each other. The data network comprises preferably an ATM-network, but also networks of other types can be used. The method according to the invention can also be adapted to other architectures having the problem of fair buffering of the data to be sent. According to the invention in the overloading situation of the buffer or in the case, where the overloading limit imposed to the buffer is about to be exceeded, the amount of cells to be buffered and coming to the node point is restricted. The overloading situation may be present for instance in the case, when three quarters of the total buffer capacity is in use. Restriction is made by rejecting the first cell $c_1$ to the data frame buffer 12 in incoming sequence, if the total number n of all cells in the buffer exceeds the predefined first limit value or for example the above-mentioned overloading limit, and if the number of cells sent by the connection that transferred the cell in the buffer exceeds the predefined second limit value.

In a preferred embodiment of the invention the first limit value is selected lower than the number of cells going to the buffer. This is made for instance in such a way that in a buffer, whose capacity is 2000 cells, the first limit value is selected to the value of 1500 cells. The second limit value is calculated from the formula:

$$W_i = Z\left(1 + \frac{K-X}{X-R}\right), \quad (1)$$

where:
$W_1$=permissible number of cells of the connection i in the buffer;
Z=freely selectable weighting coefficient;
K=number of cells going to the buffer;
X=number of cells in the buffer;
R=first limit value (R<K).
The formula in question can also be written in the form:

$$Y_i N_a(X-R) > Z(K-R)X. \quad (2)$$

where:
$Y_i$=number of cells of the connection i in the buffer
$N_a$=number of active connections or the connections, which have at least one cell in the buffer,
Z=freely selectable weighting coefficient;
K=number of cells going to the buffer;
X=number of cells in the buffer;
R=first limit value (R<K).
Then the fulfillment of the condition imposed by the second limit value is determined by making the comparison according to the formula (2) above. This comparison can easily be realized by calculations, because Z(K−R) is not a quantity depending on the buffer loading. It is therefore sufficient, that for each comparison one subtraction and three multiplications are performed.

On the other hand the case in the method according to the invention may be, that it is desired to reserve certain capacity for certain connections, a kind of a "guarantee capacity", by which it is secured for the connection a capacity not depending on other connections. The capacity can be reserved advantageously in advance by giving to each connection, for which it is desired to distribute the capacity, a predefined weighting coefficient, whereby the second limit value is calculated from the formula:

$$W_i = Z\frac{Q}{q_i}\left(1 + \frac{K-X}{X-R}\right), \quad (3)$$

where:
$W_1$=permissible number of cells of the connection i in the buffer;
Z=freely selectable weighting coefficient;
K=number of cells going to the buffer;
X=number of cells in the buffer;

R=first limit value (R<K).
$q_i$=weighting coefficient of connection 1; and $$Q = \sum_{j=1}^{N_a} q_j;$$

Further the formula in question can be written in the form:

$$Y_iQ(X-R)>Z(K-R)q_iX. \quad (4)$$

where:
$Y_i$=number of cells of tile connection i in the buffer;

$$Q = \sum_{j=1}^{N_a} q_j;$$

Z=freely selectable weighting coefficient:
K=number of cells going to the buffer;
X=number of cells in the buffer;
R=first limit value (R<K).
$q_1$=weighting coefficient of connection 1.

In this context it can be mentioned, that the comparison presented in the formula (4) returns to the form shown in the formula (2), if equal weighting coefficient is given to each connection or when no connection has a more privileged status regarding other connections. It is also preferable, regardless the conditions above, if the buffer is full.

Though the formulas shown above are relatively clear and simple to calculate, the time used for the calculation, depending on the equipment about 10 $\mu$s, generate delay obstructing the operation in high-speed connections Therefore in the practice it is preferable to perform the calculations beforehand as completely as possible. That is why in one advantageous embodiment a table is formed, into which is placed the second limit value with the number of cells in the buffer and the number of active connections. In the table there is then a finished limit value with different parameter values. Therefore the engendered delay can be reduced, because reading from the table can be made more rapidly than calculation of values. Additionally by using a suitable cache memory, the reading time can further be decreased. Because it is unlikely that all the cells in the buffer belong to a different connection, the size of the table can be reduced essentially smaller by assuming, that the number of active connections is clearly below the buffer's maximum capacity. Further if the number of active connections exceeds the assumed value, the greatest number of active connections in the table will be used as parameter.

In one advantageous embodiment of the present invention the buffer size is selected according to the size of the frames to be sent, so that their ratio is preferably about 50. Thus can be ensured that the ratio between the buffer size and the frame size to be used is sufficient in order that the available capacity can be distributed as fairly as possible between the connections.

Also in one advantageous embodiment the size of the table to be formed can be reduced by decreasing the number of tabulable values X or the amount of cells in the buffer. In certain simulations it has been observed, that the variation of the parameter Z between 0,5–1 influences only slightly the fairness of the buffering, whereby as parameter X in the table can be used a staggered parameter X*, which can be determined as follows:

$$X^* = G\lfloor X/G+0,5 \rfloor, \text{ where } \lfloor \; \rfloor \text{ refers to the integer} \quad (5)$$

In this formula G means a staggering constant influencing the table size. In some tests that have been realized by the method according to the invention it has been observed that even five different values of $W_1$ are sufficient in order to obtain necessary fairness.

One advantage of the present invention compared with the known technique comprises the possibility to divide the buffer space dynamically for many simultaneous connections in an effective and simple way. In tile overloading situation only the connection using higher than average network capacity, data frame losses take place. Embodiments using the connections in question may thereafter reduce their speed and thus avoid the frame losses. The invention offers also the advantage that by the method according the invention it is possible to weigh the capacity to be distributed for different connections by weighting coefficients.

The presented method offers further, compared with RED and EFCI-methods, substantially more justifiable capacity distribution of the network for different connections. Compared with the WFQ-method the presented method can be realized in a significantly simpler way thanks to the FIFO-buffering. Also compared with the static WFQ-method the need for buffering capacity of the presented method is significantly lower, because the capacity of the FIFO-buffer can be utilized very effectively (up to certain limit each free buffer position is available for the cell of any connection).

It can also be stated that the invention has an essential effect upon realization of services adapted for the data traffic in an ATM-network. The presented traffic control method enables advantageous, but simultaneously fair service.

BRIEF DESCRIPTION OF THE DRAWINGS

The invention will be described in the following as an example referring to some simulation results obtained by the method according to the invention and accompanying drawings, in which:

FIG. 1 is a graph depicting in curve form rejection operations of different algorithms;

FIGS. 3 to 8 are tables reporting the results obtained in the simulations hereinafter described.

DETAILED DESCRIPTION OF THE PREFERRED EMBODIMENTS

Figures 1, 3:
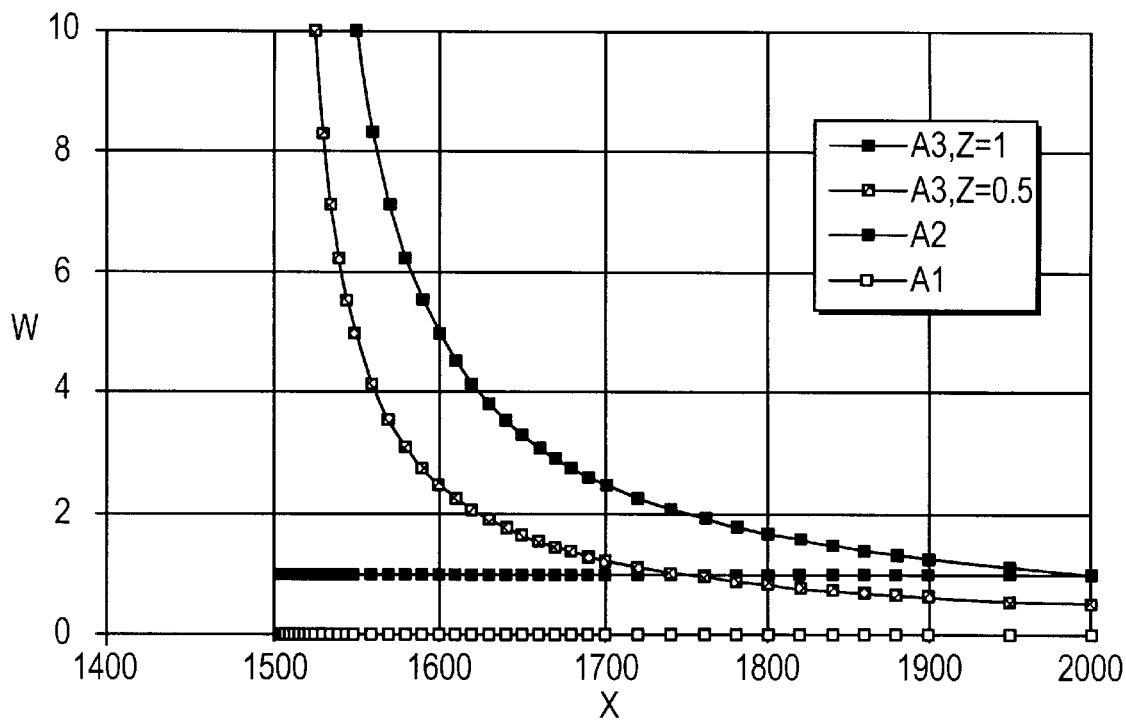
Figure 2A:
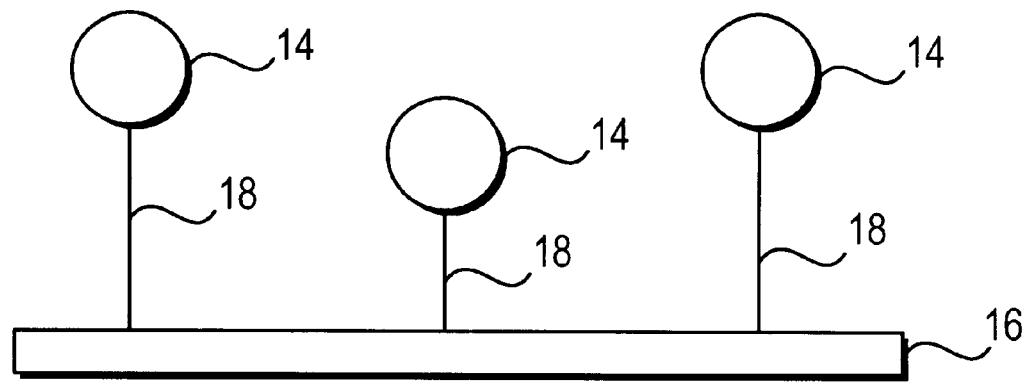
FIGS. 2A and 2B diagrammatically depict the relevant portions of a data network on which the inventive method may be practiced.
Figure 2B:
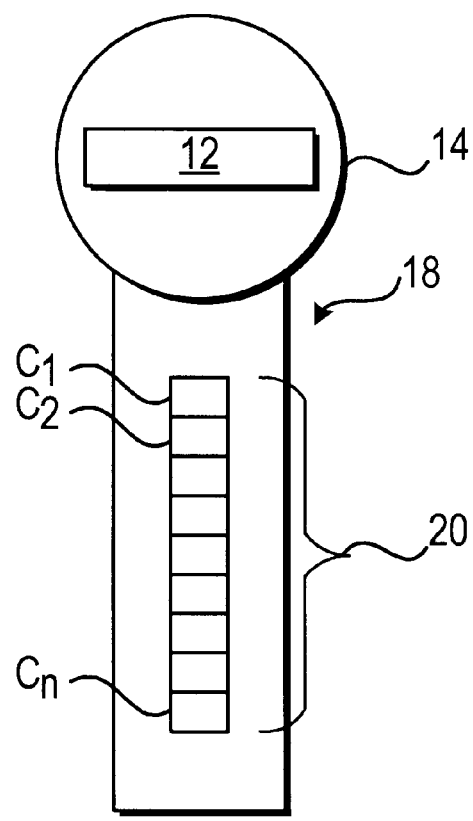

Algorithm A3 according to the present invention is compared to two significantly simpler, but clearly more unjustified algorithms A1 and A2. In compliance with the algorithm A1 a cell coming to the node point is rejected, if X>R, where X and R are the same as above. The weakness of this algorithm is clearly visible. One connection may alone take a great part of the buffer, whereby other connections are in a weaker position regarding it. It would, however, be expedient in an overloading situation to reject cells from the connection, which uses the buffer capacity more than the others. By the second algorithm A2 it is tried to eliminate the above-mentioned problem. In the algorithm A2 the first cell of the frame in the input sequence is rejected, if X>R and $W_i$>1. In FIG. 1 of the drawing is presented the number of cells allowed by the above-mentioned algorithms A1, A2 and A3 for certain connection as a function of the number of cells in the buffer. Following algorithms have been used in the algorithms: K=2000, R=1500, Z=0,5, X=1525 and $N_a$=5. In the algorithm A3, when the number of cells in the buffer are attaining the number of cells going to the buffer, the second limit value $W_i$ is reduced substantially under one. Therefore almost all cells are rejected, because the algorithm tries to balance the use of the buffer capacity between the connections, when the number of cells in the buffer increases.

This is a remarkable quality, because a part of the buffer capacity must be left for the remaining cells of the accepted frames. Operation of the algorithm A3 can be worked out depending on the adaptation by the selection of parameters R and Z.

In the following some simulation results are shown referring to the tables of FIGS. 3 to 6 1–4 for the algorithms A1, A2 and A3. In order to state the fairness a reference model is used based on the assumption, that traffic variations are relatively slow. Then the fair algorithm rejects cells in such a way, that there exists a maximum cell speed $W_{max}$ satisfying the following terms when the loading exceeds the bus capacity:

$$\sum_{i=1}^{N} w_i(1 - B_i') = C \quad (6)$$

wherein for the $w_i$ connection i the characteristic cell speed, C is the bus speed, and:

$$B_i^* = 0, \text{ if } w_i \le w_{max} \quad (7)$$

$$B_i^* = \frac{w_i - w_{max}}{w_i}, w_i > w_{max}$$

In other words $W_{max}$ is the greatest permissible band, which the connection may use in an overloading situation. The final cell loss ratio is determined as follows:

$$B_i^* = \frac{\sum_{j=1}^{N} m_j B_j}{\sum_{j=1}^{N} m_j B_j^*} B_i^* \quad (8)$$

where $m_i$ means the average bit speed of the connection and N the number of the connections. Based on the reference model above the fairness or justification index can be presented as follows:

$$F = 1 - \frac{\sqrt{\sum_{i=1}^{N} m_i \sum_{i=1}^{N} m_i (B_i - B_i^*)^2}}{\sum_{i=1}^{N} m_i B_i^*} \quad (9)$$

where $B_i$ means the simulated cell loss ratio of the connection i. The fairness index has following qualities:

F=1, if in all connections $B_i = B_i^*$ if $m_i = m_o$ for each i value and $B_i$:s comprise exponentially distributed random numbers, F is typically about zero F does not change, if each $B_i$ and $B_i^*$ is multiplied by the same constant F is weighted by the average band width of each connection in order to avoid overweighting of connections in small cell speeds.

In FIG. 3 are presented the source types used in the simulations. The simulation program determines the connection activity 8000 between time intervals. In the table it has also been shown the simulation results for mere FIFO-buffer, A1, A2 and A3. As parameters has been used the following values: R=1500, Z=0,5, 0,9 and 1 (A3).

In FIGS. 4 to 6 there are shown the simulated cell loss of each connection and the calculated reference value as well as the average cell loss $B_{ave}$. In the last column it is presented the fairness or justification index determined by simulation. As clearly shown in the tables, the algorithm is significantly more justified than other buffering algorithms used in the comparison. It can also be observed that the selection of the parameter Z does not influence very much the fairness. It does not, however, make calculations more complicated, so that there is no reason for its deletion. Actual traffic in the data network influences the selection of parameters R and Z.

In FIG. 7 there is presented the influence of the staggering according to the formula (5) to the simulation results. Firstly by staggering properly the above-mentioned parameter table the table size can be reduced to 100 kilobits, eliminating thus the problems caused by the table size. In the table the number of levels refers to the number of different $W_i$ values. As can be discovered in the table, the level number can be reduced even significantly without a substantial influence to the fairness index.

In FIG. 8 has been shown the influence of the ratio of the buffer size and frame size to the fairness index. As shown in FIG. 8, the maximum ratio of the buffer size to the frame size should be at least 50 in order that sufficient fairness would be maintained. For instance, if the maximum frame size is 200, the buffer size must be about 10000.

The method according to the invention can be realized in a network node point by suitable combinatory logic and counter arrangement in the node before depositing the cells into the buffer. The buffer can comprise alternatively either an input, output or inner coupling field buffer. The physical realization contains further for each connection the following components: counter, which tells the number of cells of the connection in question in the buffer, ticket which tells whether the previous cell of the connection in question was the last one in the frame, and ticket which tells whether the cells belonging to the frame in question has been rejected before. These components can be realized with components generally used in the digital technique.

Finally as a summary it can be concluded that by the method according to the invention and the FIFO-buffers it is possible to realize very impartially a buffering method utilizing the buffer capacity. The presented method is especially suitable for control of UBR-connection to be realized in the ATM-network, because this method reacts rapidly in an over-loading situation.

The invention is not restricted to concern the above-shown examples, but many modifications are possible within the inventionial idea defined in the claims.

What is claimed is:

1. A method for managing a buffer in a data network having a plurality of node points, a data bus connecting the node points, a predefined number of connections through which method data is transferable in data frames each comprising a plurality of data cells, the method comprising the steps of:

buffering data in one of the node points in order to adapt data network capacity to correspond to a capacity required by the transferable data; and restricting, in an overloading situation, a quantity of data cells to be buffered and that are directed to the one of the node points by rejecting a first data cell in an input sequence of the data frame of the directed data cells when a total number of all data cells in the buffer exceeds a first predefined limit value and the quantity of data cells directed to the one of the node points exceeds a second predefined limit value.

2. A method according to claim 1, characterized in that the first predefined limit value (R) is selected lower than the quality of cells (K) directed to the buffer, and that the second predefined limit value ($W_i$) is calculated from the formula:

$$W_i = Z\left(1 + \frac{K-X}{X-R}\right),$$

where:

$W_i$=permissible number of cells of the connection i in the buffer;

Z=freely selectable weighting coefficient;

K=number of cells directed to the buffer;

X=number of cells in the buffer;

R=first predefined limit value (R<K).

3. A method according to claim 1, characterized in that the data network capacity is distributed by giving each connection a predefined weighting coefficient, wherein the second predefined limit value is calculated from the formula:

$$W_i = Z\frac{Q}{q_i}\left(1 + \frac{K-X}{X-R}\right),$$

where:

$W_i$=permissible number of cells of the connection i in the buffer;

Z=freely selectable weighting coefficient;

K=number of cells directed to the buffer;

X=number of cells in the buffer;

R=first predefined limit value (R>K), $q_i$=weighting coefficient of the connection i; and Q=sum of the weighting coefficients.

4. A method of claim 1, wherein the first cell is rejected, if the buffer is full.

5. A method according to claim 1, wherein a table is formed, into which a second predefined limit value ($W_i$) is placed with the number of cells in the buffer and the number of active connections, whereby the connection is active, if at least one of the cells in the buffer belongs to it.

6. A method according to claim 1, wherein a buffer size is selected according to size of the frames to be sent, so that their ratio is advantageously about 50.

* * * * *